United States Patent
Ishibashi et al.

(10) Patent No.: US 12,422,019 B2
(45) Date of Patent: Sep. 23, 2025

(54) TORSIONAL VIBRATION REDUCING DEVICE

(71) Applicant: TOYOTA JIDOSHA KABUSHIKI KAISHA, Toyota (JP)

(72) Inventors: Masayuki Ishibashi, Numazu (JP); Shinichiro Suenaga, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 432 days.

(21) Appl. No.: 18/067,260

(22) Filed: Dec. 16, 2022

(65) Prior Publication Data

US 2023/0258242 A1 Aug. 17, 2023

(30) Foreign Application Priority Data

Feb. 17, 2022 (JP) ................. 2022-022648

(51) Int. Cl.
*F16F 15/129* (2006.01)
*F16D 7/02* (2006.01)
*F16F 15/123* (2006.01)

(52) U.S. Cl.
CPC .......... *F16F 15/1297* (2013.01); *F16D 7/025* (2013.01); *F16F 15/123* (2013.01)

(58) Field of Classification Search
CPC ...... F16F 15/1297; F16F 15/123; F16D 7/025
USPC .................................. 464/46, 68.1
See application file for complete search history.

(56) References Cited

U.S. PATENT DOCUMENTS

| 5,713,796 A | * | 2/1998 | Fukamachi | ........... F16F 15/161 464/68.3 |
| 8,517,843 B2 | * | 8/2013 | Yamada | ................... F16D 7/025 464/47 |
| 2003/0195047 A1 | | 10/2003 | Suzuki et al. | |

FOREIGN PATENT DOCUMENTS

| JP | 7-224892 A | 8/1995 |
| JP | 7-224896 A | 8/1995 |
| JP | 7-224897 A | 8/1995 |
| JP | 2009-292477 A | 12/2009 |
| JP | 2011-12705 A | 1/2011 |
| WO | WO 95/22016 A1 | 8/1995 |

* cited by examiner

*Primary Examiner* — Greg Binda
(74) *Attorney, Agent, or Firm* — Oblon, McClelland, Maier & Neustadt, L.L.P.

(57) ABSTRACT

A torsional vibration reducing device includes: a mass damper configured to reduce ripples of torque by inertia moment of an inertial body; a spring damper configured to reduce ripples of torque to be transmitted between an input-side rotational member and an output-side rotational member by an elastic body being compressed are placed side by side in a predetermined axis direction; and a bolt configured to fix the inertial body and the input-side rotational member to each other in the predetermined axis direction by being inserted from the input-side rotational member side. The input-side rotational member includes a receiving portion recessed toward the mass damper side such that at least part of a head of the bolt in its height direction is received by the receiving portion.

7 Claims, 4 Drawing Sheets

TORSIONAL VIBRATION REDUCING DEVICE

CROSS-REFERENCE TO RELATED APPLICATION

This application claims priority to Japanese Patent Application No. 2022-022648 filed on Feb. 17, 2022, incorporated herein by reference in its entirety.

BACKGROUND

1. Technical Field

This disclosure relates to a torsional vibration reducing device including a mass damper and a spring damper. The mass damper is configured to reduce ripples of torque by the inertia moment of an inertial body. The spring damper is configured to reduce ripples of torque by connecting two plates to each other in a rotation direction via an elastic body.

2. Description of Related Art

Japanese Unexamined Patent Application Publication No. 2009-292477 (JP 2009-292477 A) describes a torsional vibration reducing device including a mass damper and a spring damper. The torsional vibration reducing device is configured such that the spring damper is connected, via a torque limiter, to an annular first rotational member connected to an engine, and further, an annular inertial body functioning as the mass damper is connected to a second rotating member that is a rotational member provided on the output side of the spring damper. The torque limiter is constituted by a plate configured to rotate together with the first rotational member in an integrated manner, an intermediate member configured to make frictional contact with a first side surface of the plate, a coned disc spring configured to press the plate toward the intermediate member side, and an annular plate placed across the coned disc spring from the plate and fixed to the first rotating member by bolt. Further, the first rotational member and the second rotational member are placed side by side in an axis direction, and the inertial body is fixed, by bolt, to a side surface of the second rotational member, the side surface facing the opposite side from the first rotational member.

Japanese Unexamined Patent Application Publication No. 7-224892 (JP 7-224892 A) or Japanese Unexamined Patent Application Publication No. 7-224897 (JP 7-224897 A) describes a vibration reducing device constituted by: a flexible plate connected to an engine; a ring member brought into contact with a side surface of the flexible plate; a hub flange configured to rotate together with an output shaft in an integrated manner; a damping portion configured to elastically connect the ring member to the hub flange in a circumferential direction and to attenuate torsional vibrations between these members; and an inertia member integrated with the hub flange. The flexible plate, the damping portion, and the inertia member are placed side by side in an axis direction, and the inertia member formed in an arcuate shape is fixed, by rivet, to a side surface of the flexible plate, the side surface facing the opposite side from the damping portion out of side surfaces of the flexible plate. Further, the flexible plate and the ring member are fixed to each other by a bolt inserted from the flexible plate side, and a notch corresponding to a bolt head of the bolt is formed in the inertia member. Note that the inertia member integrated with the hub flange described in JP 7-224896 A is configured to function as an input member of a clutch mechanism.

SUMMARY

In the vibration reducing device described in JP 2009-292477 A, the first rotational member, the spring damper, and the inertial body are placed side by side in this order in a rotation central axis direction. Further, the second rotational member as a rotational member on the output side of the spring damper and the inertial body are fixed to each other by a bolt inserted from the inertial body side, and a bolt head of the bolt projects from the inertial body. That is, the length of the vibration reducing device in the axis direction is a length corresponding to the sum of respective thicknesses of the first rotational member, the spring damper, and the inertial body, and the projection amount of the bolt head. There is room for improvement to shorten the length in the axis direction.

Further, the length, in the axis direction, of the vibration reducing device described in JP 7-224892 A or JP 7-224897 A is a length corresponding to the sum of respective thicknesses of the inertial body, the flexible plate, the damping portion, and the inertia member integrated with the hub flange. That is, since the inertial body is provided to increase the inertia moment on the input side of the damping portion, the length of the vibration reducing device in the axis direction is made long. In view of this, there is room for improvement to shorten the length of the vibration reducing device in the axis direction.

This disclosure is accomplished in view of the above technical problem, and an object of this disclosure is to provide a vibration reducing device that can be shortened in length in the axis direction.

In order to achieve the above object, this disclosure provides a torsional vibration reducing device in which a mass damper and a spring damper are placed side by side in a predetermined axis direction. The mass damper is configured to reduce ripples of torque by inertia moment of an inertial body. The spring damper includes an elastic body configured to be compressed by relative rotation between an input-side rotational member and an output-side rotational member. The spring damper is configured to reduce ripples of torque to be transmitted between the input-side rotational member and the output-side rotational member by the elastic body being compressed. The torsional vibration reducing device includes a bolt configured to fix the inertial body and the input-side rotational member to each other in the predetermined axis direction by being inserted from the input-side rotational member side. The input-side rotational member includes a receiving portion recessed toward the mass damper side such that at least part of a head of the bolt in a height direction of the bolt is received by the receiving portion.

Further, in this disclosure, the receiving portion may be formed to have a depth equal to or less than a height of the head of the bolt.

Further, in this disclosure, an end portion of the spring damper may be placed closer to the mass damper side than a distal end of the head of the bolt in the predetermined axis direction. The end portion of the spring damper may be placed closer to the mass damper side than an end portion of the receiving portion in the predetermined axis direction.

Further, in this disclosure, the torsional vibration reducing device may further include a torque limiter configured to restrict torque to be transmitted between the mass damper and the spring damper. The torque limiter may include two plates integrated with each other by being laminated in the predetermined axis direction. The two plates may be placed to be laminated on the mass damper in the predetermined axis direction. The input-side rotational member may include an outer plate laminated across an inner plate from the mass damper, the inner plate being making contact with the mass damper out of the two plates. The receiving portion may include a through-hole penetrating through the outer plate.

Further, in this disclosure, a part of the input-side rotational member, the part including the receiving portion, may be formed to have a plate thickness thicker than other parts.

Furthermore, in this disclosure, the input-side rotational member may include a driving-side rotational member configured to transmit torque to the spring damper, and an inertia member integrated with the driving-side rotational member in the predetermined axis direction. The receiving portion may be formed in the inertia member.

In this disclosure, the mass damper and the spring damper are arranged side by side in the predetermined axis direction, and the bolt is inserted from the input-side rotational member side of the spring damper such that the inertial body and the input-side rotational member are fixed to each other by the bolt. This accordingly makes it possible to restrain the head of the bolt from projecting toward the inertia body side. That is, it is possible to restrain the length, in the axis direction, of the torsional vibration reducing device from becoming long due to the head of the bolt projecting from the inertial body. Further, the input-side rotational member is provided with the receiving portion recessed toward the mass damper side such that at least part of the head of the bolt is received by the receiving portion. Accordingly, it is possible to reduce the projection amount of the head of the bolt from the input-side rotational member, thereby making it possible to restrain the length, in the axis direction, of the torsional vibration reducing device from becoming long.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
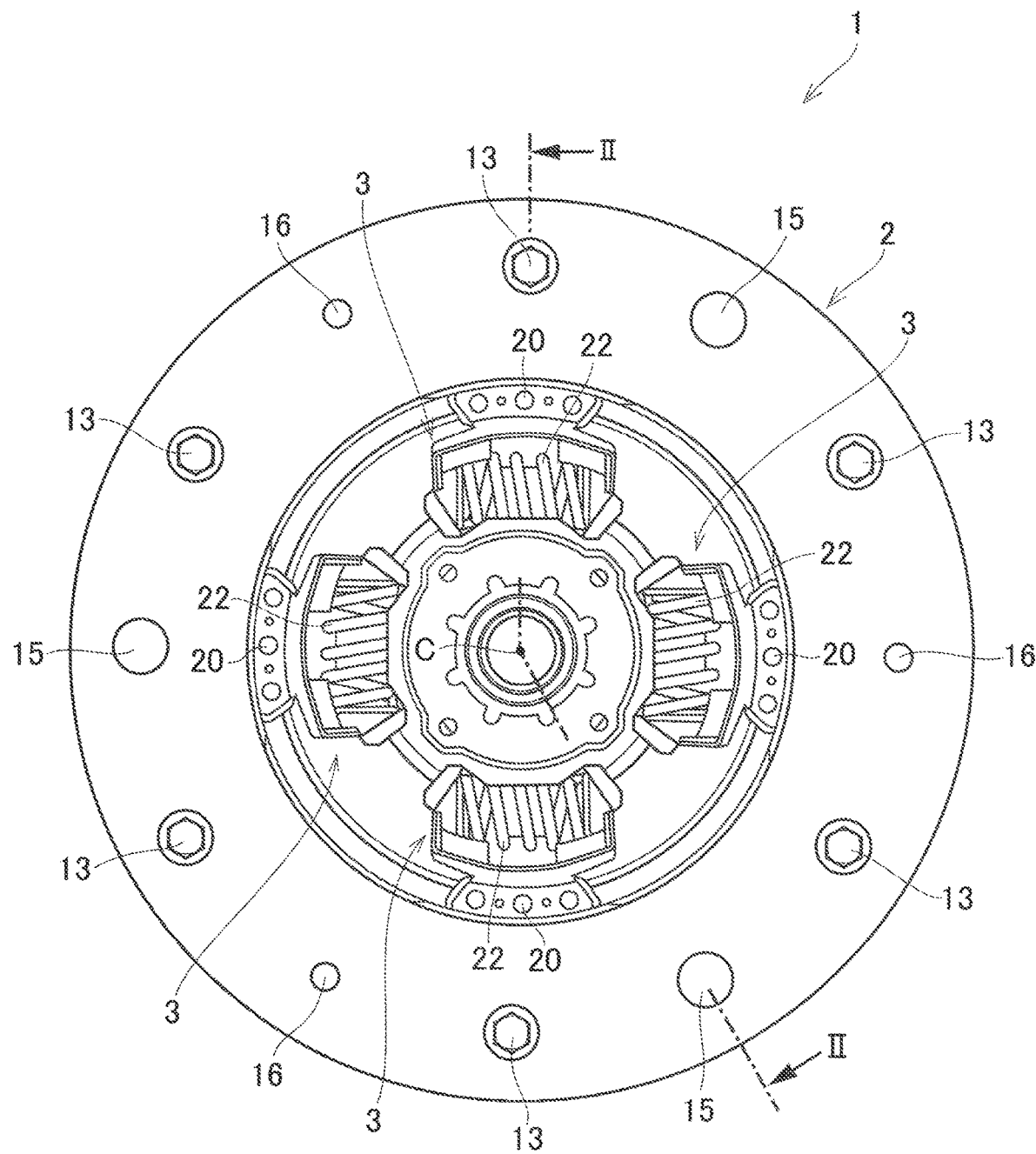
FIG. 1 is a front view of a torsional vibration reducing device in an embodiment of this disclosure.
Figure 2:
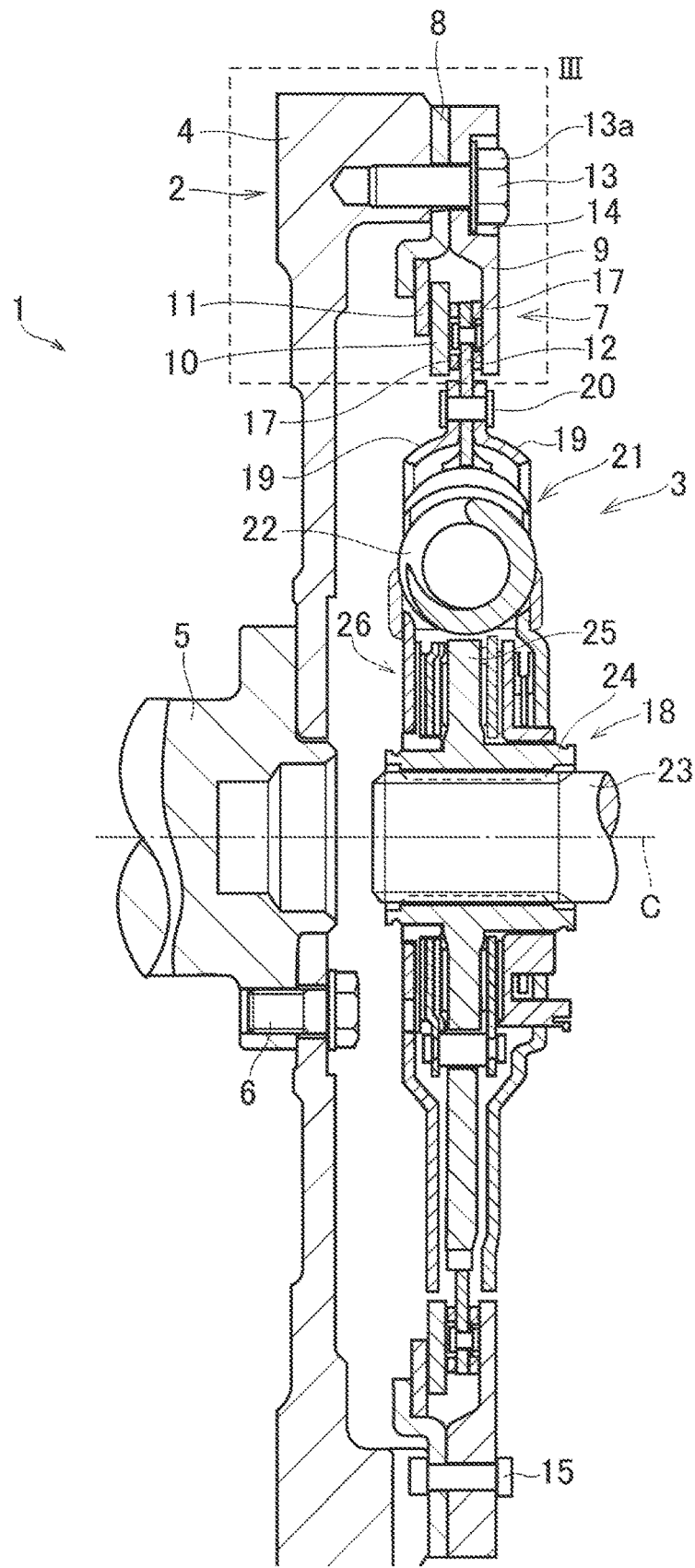
FIG. 2 is a sectional view taken along a line II-II in FIG. 1.
Figure 3:
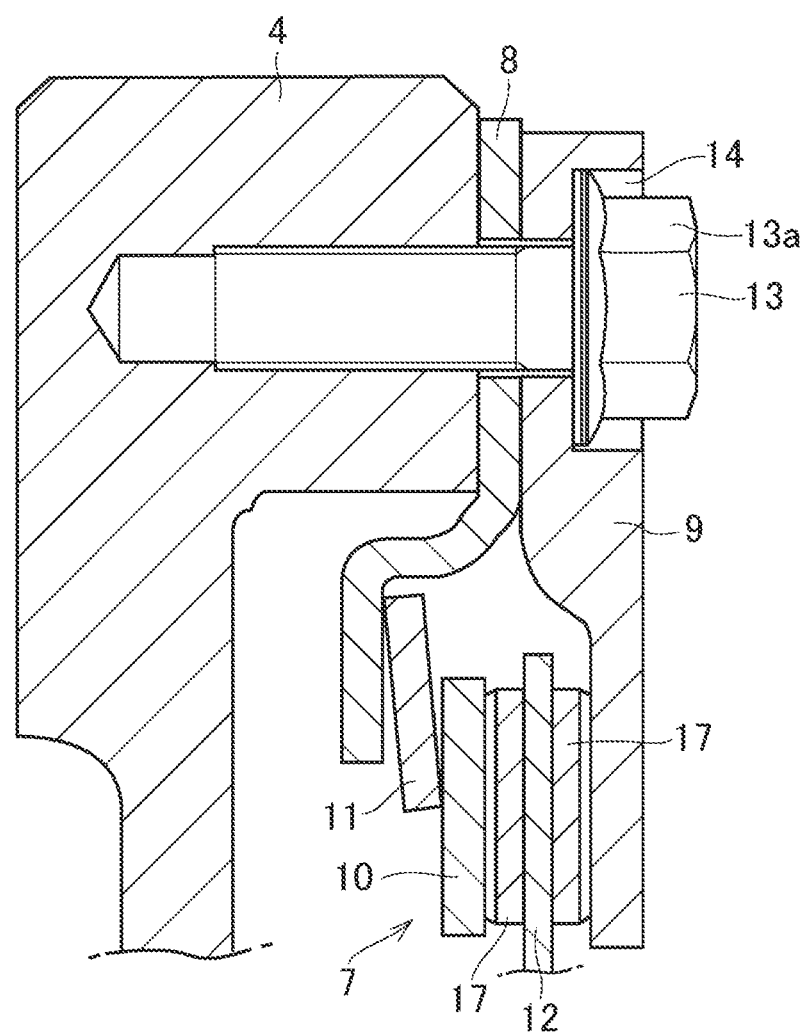
FIG. 3 is an enlarged view of a part III in FIG. 2.

A front view to describe an example of a torsional vibration reducing device in an embodiment of this disclosure is illustrated in FIG. 1, a sectional view taken along a line II-II in FIG. 1 is illustrated in FIG. 2, and further, an enlarged view of a part III in FIG. 2 is illustrated in FIG. 3.

As illustrated in FIGS. 1, 2, a torsional vibration reducing device 1 is constituted by a mass damper 2 configured to reduce ripples (torsional vibrations) of torque by the inertia moment of an inertial body, and a spring damper 3 configured to reduce ripples (torsional vibrations) of torque by an elastic body being compressed. The mass damper 2 and the spring damper 3 are placed side by side in a rotation central axis C direction of a crankshaft 5 (described later).

As illustrated in FIG. 2, the mass damper 2 is constituted by a flywheel 4 formed in an annular shape. That is, the flywheel 4 functions as an inertial body.

The crankshaft 5 of an engine (not illustrated) abuts with an inner-peripheral-side side surface of the flywheel 4, and the crankshaft 5 and the flywheel 4 are integrated with each other by a bolt 6 inserted from the opposite side from the engine. Further, the plate thickness of an outer peripheral portion of the flywheel 4 is made thicker than the plate thickness of an inner peripheral portion thereof such that the outer peripheral portion projects toward the opposite side from the engine. By thickening the plate thickness of the outer peripheral portion of the flywheel 4 as such, the mass of the flywheel 4 is increased, so that the inertia moment of the flywheel 4 is also increased. That is, a torsional vibration reduction effect of the mass damper 2 can be improved.

The flywheel 4 is provided with a torque limiter 7 configured to restrict torque to be transmitted between the flywheel 4 and the spring damper 3. The torque limiter 7 can be configured similarly to a conventional torque limiter. The torque limiter 7 is constituted by a frictional engagement mechanism configured such that, in a case where a torque equal to or more than a predetermined torque determined in advance works, the torque to be transmitted by relative rotation between an input-side rotational member and an output-side rotational member is restricted.

As illustrated in FIGS. 2, 3, the torque limiter 7 is constituted by a support plate 8 and a cover plate 9 integrated with the flywheel 4, a pressure plate 10 placed to face the cover plate 9, a coned disc spring 11 configured to press the pressure plate 10 toward the cover plate 9 side, and a driving-side rotational member 12 placed between the pressure plate 10 and the cover plate 9. The support plate 8 and the cover plate 9 correspond to "two plates" in the embodiment of this disclosure, and the cover plate 9 corresponds to an "outer plate" in the embodiment of this disclosure.

The support plate 8 is formed by press working or the like such that an outer-peripheral-side side surface of the support plate 8 makes contact with an outer-peripheral-side end surface of the flywheel 4, and a part on the inner peripheral side from a part making contact with the flywheel 4 is bent toward the flywheel 4 side. That is, the support plate 8 is formed to be bent such that an inner-peripheral-side edge of the support plate 8 is placed inside the outer peripheral portion of the flywheel 4.

The cover plate 9 corresponds to an "input-side rotational member" in the embodiment of this disclosure and is provided across the support plate 8 from the flywheel 4. That is, the cover plate 9 and the support plate 8 are placed in a laminated manner in the rotation central axis C direction of the crankshaft 5, and the cover plate 9 and the support plate 8 are placed to be laminated on the flywheel 4 functioning as the mass damper 2.

The cover plate 9 can be also formed by press working like the support plate 8 such that the plate thickness of the outer peripheral side of the cover plate 9 is thicker than the plate thickness of the inner peripheral side of the cover plate 9. More specifically, a side surface of the cover plate 9 on the opposite side from the flywheel 4 is formed to be a flat surface, and the plate thickness of the outer peripheral side of the cover plate 9 is made thick such that an outer-peripheral-side part of a side surface of the cover plate 9 on the flywheel 4 side projects toward the flywheel 4 side from an inner-peripheral-side part thereof. In other words, an outer peripheral portion of the cover plate 9 curves toward the flywheel 4 side, so that the outer peripheral portion is recessed toward the flywheel 4 relative to an inner peripheral portion of the cover plate 9 due to the curving, and a thickened portion configured to receive a bolt head 13a and having an increased plate thickness is formed in the part thus recessed. Note that the inside diameter of the cover plate 9 is formed to be smaller than the inside diameter of the support plate 8.

The outer-peripheral-side part is fixed to the flywheel 4 by a bolt 13 from the cover plate 9 side. A recessed portion 14 configured to receive at least part of the bolt head 13a is formed in the outer peripheral portion of the cover plate 9 as illustrated in FIG. 3. That is, the recessed portion 14 is formed to have an opening diameter larger than the diameter of the bolt head 13a. In other words, the plate thickness of outer peripheral portion of the cover plate 9, except the recessed portion 14 that receives the bolt head 13a, is made thick so as to correspond to the height of the bolt head 13a. It is preferable that the depth of the recessed portion 14 is equal to or more than the height of the bolt head 13a, but the recessed portion 14 may have a depth that allows the bolt head 13a to be at least partially received in the recessed portion 14 as illustrated in FIG. 3. The recessed portion 14 corresponds to a "receiving portion" in the embodiment of this disclosure.

Note that the support plate 8 and the cover plate 9 are fixed to each other by rivets at predetermined intervals in the circumferential direction as illustrated in FIG. 1. Further, in order to inspect the engine at the time of shipment, through-holes 16 penetrating through the cover plate 9, the support plate 8, and the flywheel 4 are formed at predetermined interval in the circumferential direction.

As described above, an inner-peripheral-side part of the support plate 8 is bent toward the flywheel 4 side, and the outer-peripheral-side part of the cover plate 9 is formed to have a thick plate thickness such that the outer-peripheral-side part projects toward the flywheel 4 side. In other words, an outer peripheral portion of a side surface of the cover plate 9, the side surface facing the support plate 8 side, is formed to curve toward the support plate 8 side. Accordingly, the inner-peripheral-side part of the support plate 8 and the inner-peripheral-side part of the cover plate 9 are separated from each other in the rotation central axis C direction.

The pressure plate 10 is placed to face an inner-peripheral-side surface of the cover plate 9, and the coned disc spring 11 is placed between the support plate 8 and the pressure plate 10 so as to press the pressure plate 10. That is, the coned disc spring 11 presses the pressure plate 10 toward the cover plate 9 side. The driving-side rotational member 12 configured to transmit torque to the spring damper 3 is sandwiched between the pressure plate 10 and the cover plate 9. Note that a friction material 17 configured to improve a frictional force between the pressure plate 10 and the cover plate 9 is attached to each side surface of the driving-side rotational member 12.

Accordingly, when the coned disc spring 11 presses the pressure plate 10, the driving-side rotational member 12 is sandwiched between the pressure plate 10 and the cover plate 9, so that a frictional force corresponding to a resultant clamping pressure and a friction coefficient between the driving-side rotational member 12 (more specifically, the friction material 17) and each of the pressure plate 10 and the cover plate 9 is caused, and torque is transmitted between the cover plate 9 and the driving-side rotational member 12 with torque to be caused based on the frictional force being taken as an upper limit.

The spring damper 3 is connected to the driving-side rotational member 12. The spring damper 3 is configured to attenuate and output ripples (torsional vibrations) of input torque, similarly to a conventional spring damper. The spring damper 3 illustrated in FIG. 2 includes the driving-side rotational member 12, and a following-side rotational member 18 provided to be concentric to the driving-side rotational member 12 and to be rotatable relative to the driving-side rotational member 12.

A pair of drive plates 19 having an annular plate shape is provided such that the drive plates 19 are connected, by rivets 20, to both side surfaces of the driving-side rotational member 12. Window holes 21 having a predetermined length in the circumferential direction are formed in the drive plates 19, and a coil spring 22 placed stretchably in the circumferential direction stretchably is accommodated in the window holes 21. The coil spring 22 corresponds to an "elastic body" in the embodiment of this disclosure. Note that the drive plates 19 are formed to be separated from each other toward the window holes 21 from the outer peripheral side, and respective window-hole-21-side edges of the drive plates 19 are separated from each other by generally the same distance as the outside diameter of the coil spring 22.

Further, the following-side rotational member 18 is constituted by a hollow shaft 24 splined to a transmission shaft 23 as an output member of the torsional vibration reducing device 1, and a rib portion 25 projecting outwardly from the outer peripheral surface of the hollow shaft 24 toward an annular gap formed between the drive plates 19. The rib portion 25 is configured such that, when the driving-side rotational member 12 and the following-side rotational member 18 rotate relatively to each other, the rib portion 25 compresses the coil spring 22 between the rib portion 25 and a wall surface of the window hole 21 in the circumferential direction.

Accordingly, when the driving-side rotational member 12 and the following-side rotational member 18 rotate relatively to each other, the coil spring 22 is compressed to absorb and attenuate ripples of torque to be transmitted between the driving-side rotational member 12 and the following-side rotational member 18 in accordance with a compression amount of the coil spring 22. Note that a frictional engagement device 26 is provided in the gap, in the rotation central axis C direction, between with an inner peripheral portion of each of the drive plate 19 and an inner peripheral portion of the rib portion 25. The frictional engagement device 26 includes a plurality of plates and friction materials provided in a laminated manner and is configured to transmit torque by clamping the plates and the friction materials.

As described above, by inserting the bolt 13 from the spring damper 3 side so as to fixing the cover plate 9 and the flywheel 4, it is possible to restrain the bolt head 13a from projecting toward the flywheel 4 side. That is, it is possible to restrain the length of the torsional vibration reducing device 1 in the rotation central axis C direction from becoming long due to the bolt head 13a projecting from the flywheel 4. Further, the recessed portion 14 configured to receive the bolt head 13a is formed in the cover plate 9, thereby making it possible to reduce the projection amount of the bolt head 13a. More specifically, as illustrated in FIG. 2, a member projecting most toward the output side (the right side in FIG. 2) in the rotation central axis C direction of the torsional vibration reducing device 1 is the drive plate 19 or the coil spring 22, and it is possible to restrain the bolt head 13a from projecting in the rotation central axis C direction from the drive plate 19 or the coil spring 22. In other words, by forming the recessed portion 14 configured to receive the bolt head 13a, the plate thickness of the cover plate 9 can be made thick. The cover plate 9 rotates together with the flywheel 4 in an integrated manner and has a function as an inertial body of the mass damper 2. Accordingly, by forming the plate thickness of the cover plate 9 to be thick, it is possible to increase the mass of the inertial body and to improve the inertia moment. Further, it is possible to increase the mass of the outer peripheral portion of the cover plate 9, thereby making it possible to further improve a vibration reduction effect to an increasing amount of the mass.

Note that this disclosure is not limited to the configuration in which the plate thickness of the outer peripheral side of the cover plate 9 is made thicker than the plate thickness of the inner peripheral side thereof as described above. An inertial body having a recessed portion configured to receive the bolt head 13a may be provided additionally as follows. That is, the cover plate 9 is formed to have a uniform plate thickness, and its outer peripheral portion is bent toward the flywheel 4 side. Further, another plate as an inertia member is formed integrally with a side surface of the outer peripheral portion by welding, bonding, rivet fastening, or the like.

Figure 4:
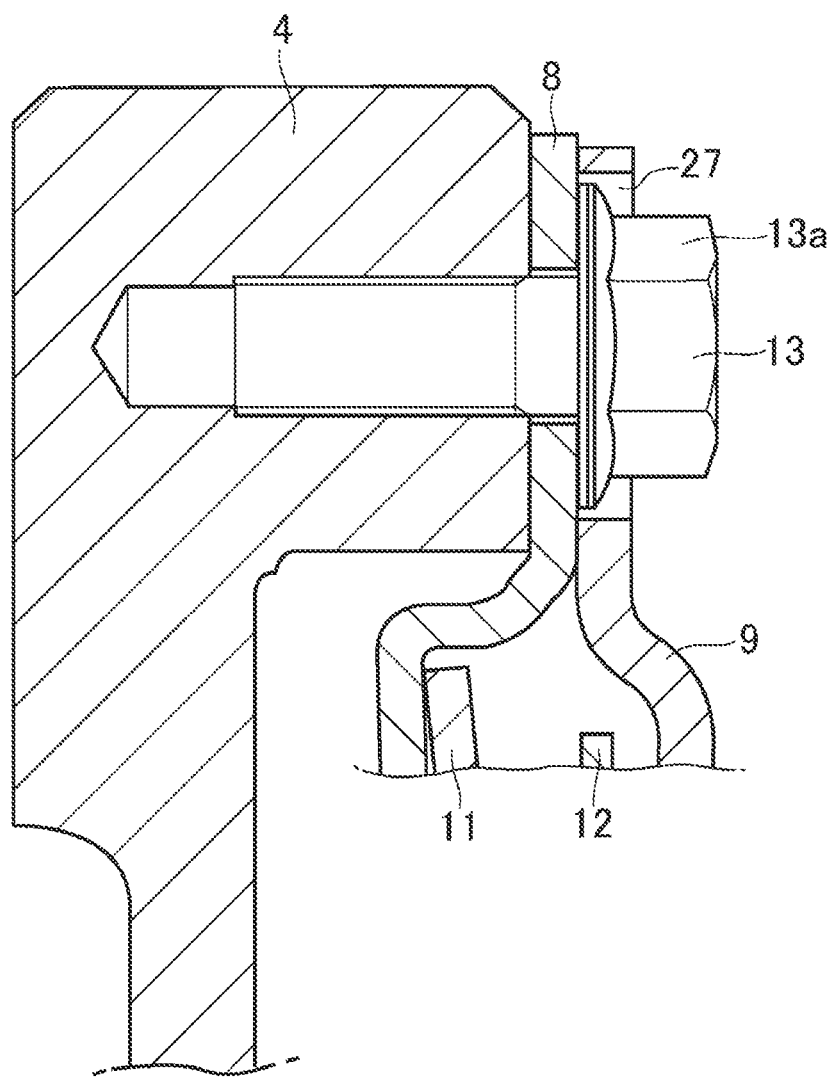
FIG. 4 is a sectional view illustrating an example in which a through-hole is formed in a cover plate such that a bolt head is inserted into the through-hole.

Further, as illustrated in FIG. 2, the cover plate 9 and the support plate 8 are integrated with each other by the rivets 15. Because of this, after the torque limiter 7 and the spring damper 3 are unitized, the torque limiter 7 and the spring damper 3 thus unitized can be assembled to the flywheel 4. Accordingly, only the support plate 8 may be fixed to the flywheel 4 by bolt. More specifically, as illustrated in FIG. 4, the support plate 8 may be fixed to the flywheel 4 such that a through-hole 27 larger than the outside diameter of the bolt head 13a is formed in the cover plate 9, and the bolt head 13a makes contact with a side surface of the support plate 8.

By forming the through-hole 27 in the cover plate 9 as such, it is possible to reduce the projection amount of the bolt head 13a. Accordingly, it is possible to increase the plate thickness of the flywheel 4 by just that much, thereby making it possible to restrain the length of the torsional vibration reducing device 1 in the rotation central axis C direction from becoming long and to improve the vibration reduction effect of the mass damper 2.

Note that the receiving portion in the embodiment of this disclosure may be configured such that the depth of the receiving portion is determined with the height of the bolt head 13a being taken as an upper limit, provided that the receiving portion can be configured to receive at least part of the bolt head 13a. By determining the depth of the receiving portion with the height of the bolt head 13a being taken as the upper limit, it is possible to restrain interference with a member placed side by side, in the axis direction, with the outer peripheral portion of the torsional vibration reducing device 1, the member being, for example, a gear or the like attached to a counter shaft provided parallel to the transmission shaft 23. This makes it possible to shorten the axial length as the whole device including the torsional vibration reducing device 1.

Further, the depth of the receiving portion may be deeper than the height of the bolt head 13a. That is, the position of an open end of the receiving portion may be recessed more than an end portion of a member projecting most in the rotation central axis C direction in the torsional vibration reducing device 1. More specifically, in a case where the spring damper 3 projects most in the rotation central axis C direction as illustrated in FIG. 2, the plate thickness of the cover plate 9 may be made thick to an end portion of a member constituting the spring damper 3 in the rotation central axis C direction in the torsional vibration reducing device 1, and the receiving portion such as the recessed portion 14 may be formed in the cover plate 9.

Further, in a case where the bolt head 13a projects most in the rotation central axis C direction in the torsional vibration reducing device 1, the plate thickness of the cover plate 9 may be made thick to the end portion of the bolt head 13a, and the receiving portion such as the recessed portion 14 may be formed in the cover plate 9. That is, in a case where the end portion of the spring damper 3 is placed closer to the mass damper 2 side than a distal end of the bolt head 13a in the rotation central axis C direction in the torsional vibration reducing device 1, the end portion of the spring damper 3 may be placed closer to the mass damper 2 side than the end portion of the recessed portion 14.

Still further, the plate thickness of the outer peripheral side of the cover plate 9 may be formed to be uniformly thick in the circumferential direction or may be formed to be partially thick. Alternatively, as described above, in a case where another plate as an inertia member is integrated with the cover plate 9 by welding, bonding, rivet fastening, or the like, a plurality of plates may be attached to the cover plate 9 such that three arcuate plates are attached to the cover plate 9 so as to be arranged side by side in the circumferential direction, for example.

Further, the torsional vibration reducing device in the embodiment of this disclosure may not include a torque limiter between a mass damper and a spring damper. In a case of the torsional vibration reducing device that does not include a torque limiter as such, the driving-side rotational member 12 serving as the input-side rotational member of the spring damper may be fixed to the mass damper by bolt, and a receiving portion such as a recessed portion configured to receive the bolt head may be formed in the plate.

What is claimed is:

1. A torsional vibration reducing device comprising:
  a mass damper and a spring damper placed side by side in a predetermined axis direction, the mass damper being configured to reduce ripples of torque by inertia moment of an inertial body, the spring damper including an elastic body configured to be compressed by relative rotation between an input-side rotational member and an output-side rotational member, the spring damper being configured to reduce ripples of torque to be transmitted between the input-side rotational member and the output-side rotational member by the elastic body being compressed;
  a torque limiter configured to restrict torque to be transmitted between the mass damper and the spring damper; and
  a bolt configured to fix the inertial body and the input-side rotational member to each other in the predetermined axis direction by being inserted from the input-side rotational member side, wherein
  the input-side rotational member includes a receiving portion recessed toward the mass damper side such that at least part of a head of the bolt in a height direction of the bolt is received by the receiving portion,
  the torque limiter includes first and second plates integrated with each other by being laminated on the mass damper in the predetermined axis direction, a pressure plate placed to face the first plate, a disc spring configured to press the pressure plate toward a first plate side, and a driving-side rotational member placed between the pressure plate and the first plate,
  the input-side rotational member includes an outer plate, being the first plate, laminated across an inner plate, being the second plate, from the mass damper, an outer peripheral portion of the inner plate being sandwiched between an outer peripheral side of the inertial body and an outer peripheral portion of the outer plate, and an outer-peripheral-side side surface of the inner plate contacting with an outer-peripheral-side end surface of the inertial body, the receiving portion is formed in the outer peripheral portion of the outer plate, and the disc spring is sandwiched between the pressure plate and an inner peripheral portion of the inner plate.

2. The torsional vibration reducing device according to claim 1, wherein the receiving portion is formed to have a depth equal to or less than a height of the head of the bolt.

3. The torsional vibration reducing device according to claim 1, wherein:

an end portion of the spring damper is placed closer to the mass damper side than a distal end of the head of the bolt in the predetermined axis direction; and the end portion of the spring damper is placed closer to the mass damper side than an end portion of the receiving portion in the predetermined axis direction.

4. The torsional vibration reducing device according to claim 1, wherein a thickness of the outer peripheral portion of the outer plate is greater than a thickness of an inner peripheral portion of the outer plate, and is greater than a thickness of the inner plate.

5. The torsional vibration reducing device according to claim 1, wherein a part of an inner peripheral portion of the inner plate is bent toward an inertial body side such that the an inner-peripheral-side edge of the inner plate is placed inside the outer peripheral portion of the inertial body.

6. The torsional vibration reducing device according to claim 5, wherein a side surface of the outer peripheral portion of the outer plate facing the inner plate is curved toward an inner plate side such that the inner peripheral portion of the inner plate and an inner peripheral portion of the outer plate are separated from each other in the predetermined axis direction.

7. The torsional vibration reducing device according to claim 1, wherein a friction material is attached to each surface side of the driving-side rotational member, and the driving-side rotational member is sandwiched between the pressure plate and the outer plate.

* * * * *